US010367991B2

(12) United States Patent
Miyazawa

(10) Patent No.: US 10,367,991 B2
(45) Date of Patent: Jul. 30, 2019

(54) FOCUS ADJUSTMENT DEVICE AND CONTROL METHOD OF FOCUS ADJUSTMENT DEVICE

(71) Applicant: Olympus Corporation, Hachioji-shi, Tokyo (JP)

(72) Inventor: Shingo Miyazawa, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/726,362

(22) Filed: Oct. 5, 2017

(65) Prior Publication Data

US 2018/0041690 A1 Feb. 8, 2018

Related U.S. Application Data

(63) Continuation of application No. PCT/JP2016/054379, filed on Feb. 16, 2016.

(30) Foreign Application Priority Data

Apr. 6, 2015 (JP) .................. 2015-077906

(51) Int. Cl.
*H04N 5/232* (2006.01)
*G02B 7/28* (2006.01)
(Continued)

(52) U.S. Cl.
CPC ........... *H04N 5/23212* (2013.01); *G02B 7/28* (2013.01); *G02B 7/36* (2013.01); *G03B 13/36* (2013.01); *H04N 5/232* (2013.01)

(58) Field of Classification Search
CPC ...... H04N 5/23212; H04N 5/232; G02B 7/28; G02B 7/36; G03B 13/36
See application file for complete search history.

(56) References Cited

U.S. PATENT DOCUMENTS

| 5,933,187 A * | 8/1999 | Hirasawa | ........... H04N 5/23296 348/240.99 |
| 2009/0148146 A1 * | 6/2009 | Maeda | ..................... G02B 7/38 396/89 |

(Continued)

FOREIGN PATENT DOCUMENTS

| EP | 0 341 692 A2 | 11/1989 |
| EP | 3 236 302 A1 | 10/2017 |

(Continued)

OTHER PUBLICATIONS

Translation of the International Preliminary Report on Patentability ("IPRP"), including the Written Opinion of the International Searching Authority, to corresponding International Application No. PCT/JP2016/054379, dated Oct. 19, 2017 (6 pgs.).

(Continued)

*Primary Examiner* — Lin Ye
*Assistant Examiner* — John H. Morehead, III
(74) *Attorney, Agent, or Firm* — John C. Pokotylo; Pokotylo Patent Services

(57) ABSTRACT

A focus adjustment device includes a focus detection region setting section, a direction determination section and control section. The focus detection region setting section sets focus detection regions which are different in size from one another. The direction determination section determines a movement direction of a focus lens to be in focus based on a change of the contrast caused by the movement of the focus lens. The control section repetitively determines whether determination results of the movement direction obtained in the respective focus detection regions are different. The control section inhibits a switchover of a focus adjustment operation when it is consecutively determined a predetermined number of times or more that the determina- (Continued)

tion results of the movement direction are different, otherwise the control section does not inhibit the switchover.

13 Claims, 17 Drawing Sheets

(51) Int. Cl.
G02B 7/36 (2006.01)
G03B 13/36 (2006.01)

(56) References Cited

U.S. PATENT DOCUMENTS

| | | | | |
|---|---|---|---|---|
| 2009/0207298 | A1* | 8/2009 | Kawanishi | H04N 5/23212 348/345 |
| 2009/0322934 | A1* | 12/2009 | Ishii | G03B 13/36 348/345 |
| 2010/0040356 | A1* | 2/2010 | Ishikawa | G03B 13/20 396/124 |
| 2011/0090393 | A1* | 4/2011 | Kawarada | H04N 5/23209 348/345 |
| 2012/0013786 | A1* | 1/2012 | Yasuda | H04N 5/23212 348/349 |
| 2013/0021516 | A1 | 1/2013 | Kikuchi | |
| 2014/0139724 | A1* | 5/2014 | Yasuda | H04N 5/23212 348/349 |
| 2014/0146213 | A1* | 5/2014 | Ueda | H04N 5/23293 348/333.02 |

FOREIGN PATENT DOCUMENTS

| | | |
|---|---|---|
| JP | 2007-178480 | 7/2007 |
| JP | 2007-293148 A | 11/2007 |
| JP | 2009-198574 | 9/2009 |
| JP | 2010-078682 | 4/2010 |
| JP | 2010-107578 | 5/2010 |
| JP | 2010-250345 | 11/2010 |
| JP | 2012-255896 A | 12/2012 |

OTHER PUBLICATIONS

International Search Report to corresponding International Patent Application No. PCT/JP2016/054379, dated Apr. 19, 2016 (2 pgs.) with translation (1 pg.).
Written Opinion of the International Searching Authority to corresponding International Application No. PCT/JP2016/054379, dated Apr. 19, 2016 (3 pgs.).
Supplementary European Search Report to corresponding European Application No. EP 16 77 6325, dated Nov. 6, 2018 (14 pgs.) with cover sheet (1 pg.).
First Office Action to corresponding Japanese Patent Application Serial No. 2015-077906, dated Mar. 5, 2019 (3 pgs.), with translation (3 pgs.).

* cited by examiner

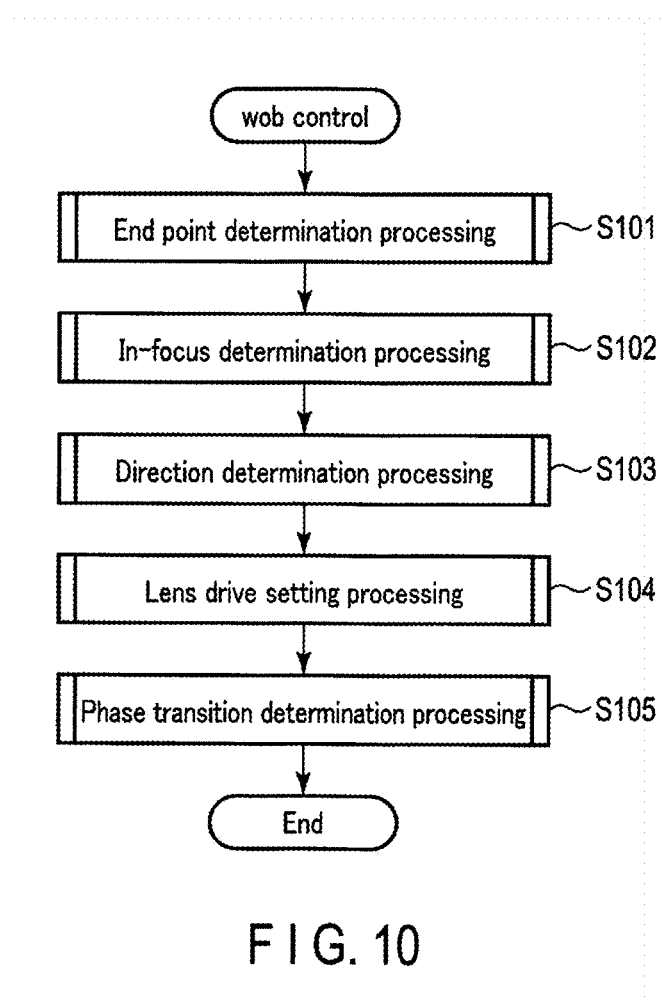
F I G. 10

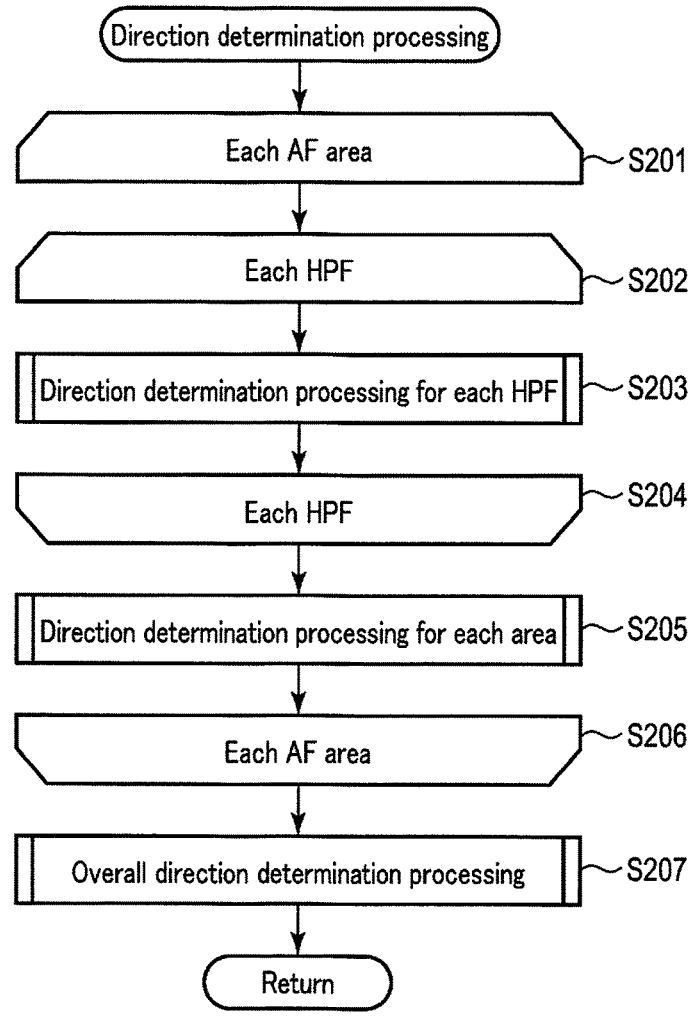
F I G. 12

| Priority order | First HPF | Second HPF | Third HPF |
|---|---|---|---|
| 1 | - | Same | Same |
| 2 | Same | - | Same |
| 3 | Same | Same | - |
| 4 | - | - | O |
| 5 | - | O | - |
| 6 | O | - | - |

FIG. 13

| Priority order | Area | | Overall |
|---|---|---|---|
| | Target area | Direction | Direction |
| 1 | Fifth small area | Near | Near |
| 2 | Eighth small area | Near | Near |
| 3 | Fourth small area | Near | Near |
| 4 | Sixth small area | Near | Near |
| 5 | Second small area | Near | Near |
| 6 | Seventh small area | Near | Near |
| 7 | Ninth small area | Near | Near |
| 8 | First small area | Near | Near |
| 9 | Third small area | Near | Near |
| 10 | Middle area | Near | Near |
| 11 | Large area | Near | Near |
| 12 | Fifth small area | Far | Far |
| 13 | Eighth small area | Far | Far |
| 14 | Fourth small area | Far | Far |
| 15 | Sixth small area | Far | Far |
| 16 | Second small area | Far | Far |
| 17 | Seventh small area | Far | Far |
| 18 | Ninth small area | Far | Far |
| 19 | First small area | Far | Far |
| 20 | Third small area | Far | Far |
| 21 | Middle area | Far | Far |
| 22 | Large area | Far | Far |

FIG. 14

| Priority order | Area | | Overall |
|---|---|---|---|
| | Condition | Direction | Direction |
| 1 | Three or more small areas including fifth small area | Near | Near |
| 2 | Three or more small areas excluding fifth small area | Near | Near |
| 3 | Two small areas including fifth small area | Near | Near |
| 4 | Four or more small areas including fifth small area | Far | Far |
| 5 | Fifth small area | Near | Near |
| 6 | Eighth small area and seventh small area | Near | Near |
| 7 | Eighth small area and ninth small area | Near | Near |
| 8 | Fourth small area and seventh small area | Near | Near |
| 9 | Sixth small area and ninth small area | Near | Near |
| 10 | Middle area | Near | Near |
| 11 | Large area | Near | Near |
| 12 | Fifth small area | Far | Far |
| 13 | Middle area | Far | Far |
| 14 | Large area | Far | Far |
| 15 | Eighth small area | Far | Far |
| 16 | Fourth small area | Far | Far |
| 17 | Sixth small area | Far | Far |
| 18 | Second small area | Far | Far |
| 19 | Seventh small area | Far | Far |
| 20 | Ninth small area | Far | Far |
| 21 | First small area | Far | Far |
| 22 | Third small area | Far | Far |

F I G. 15

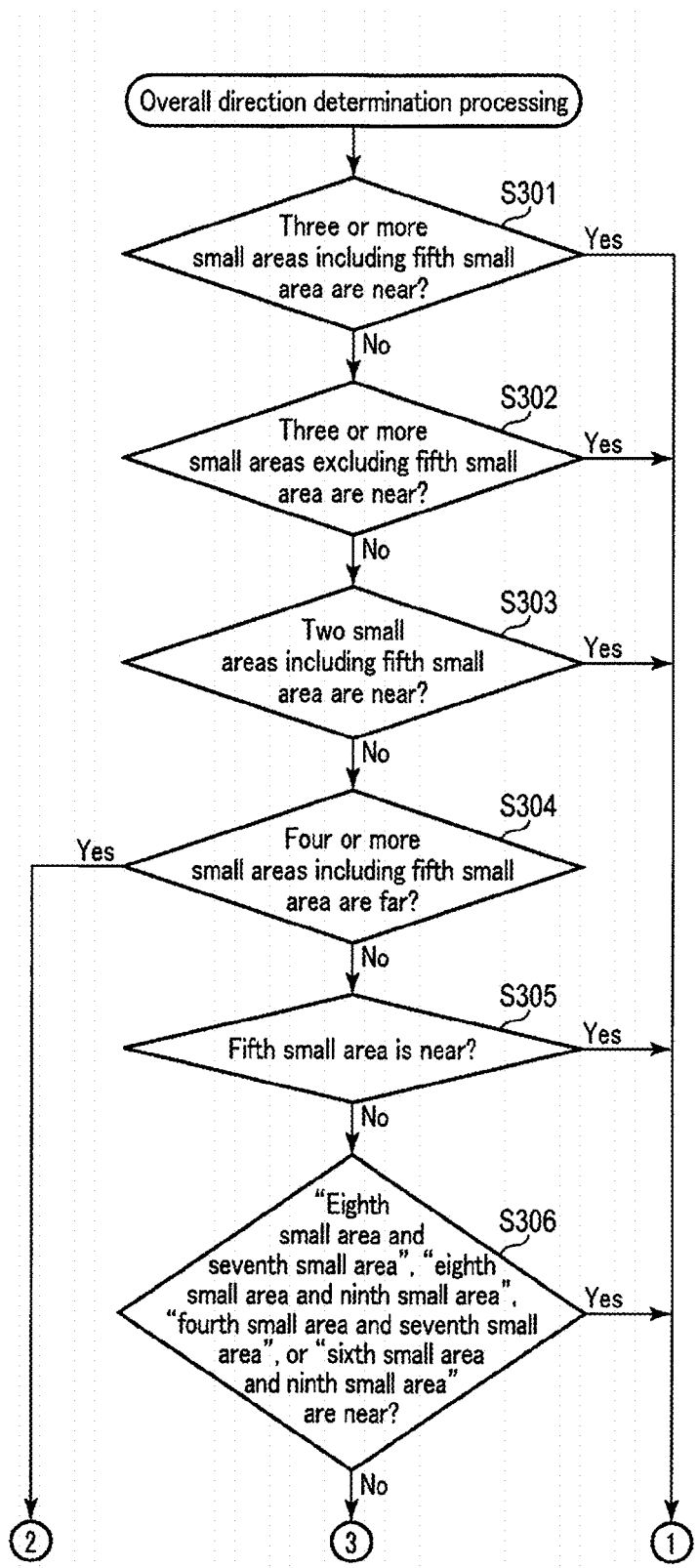
F I G. 16A

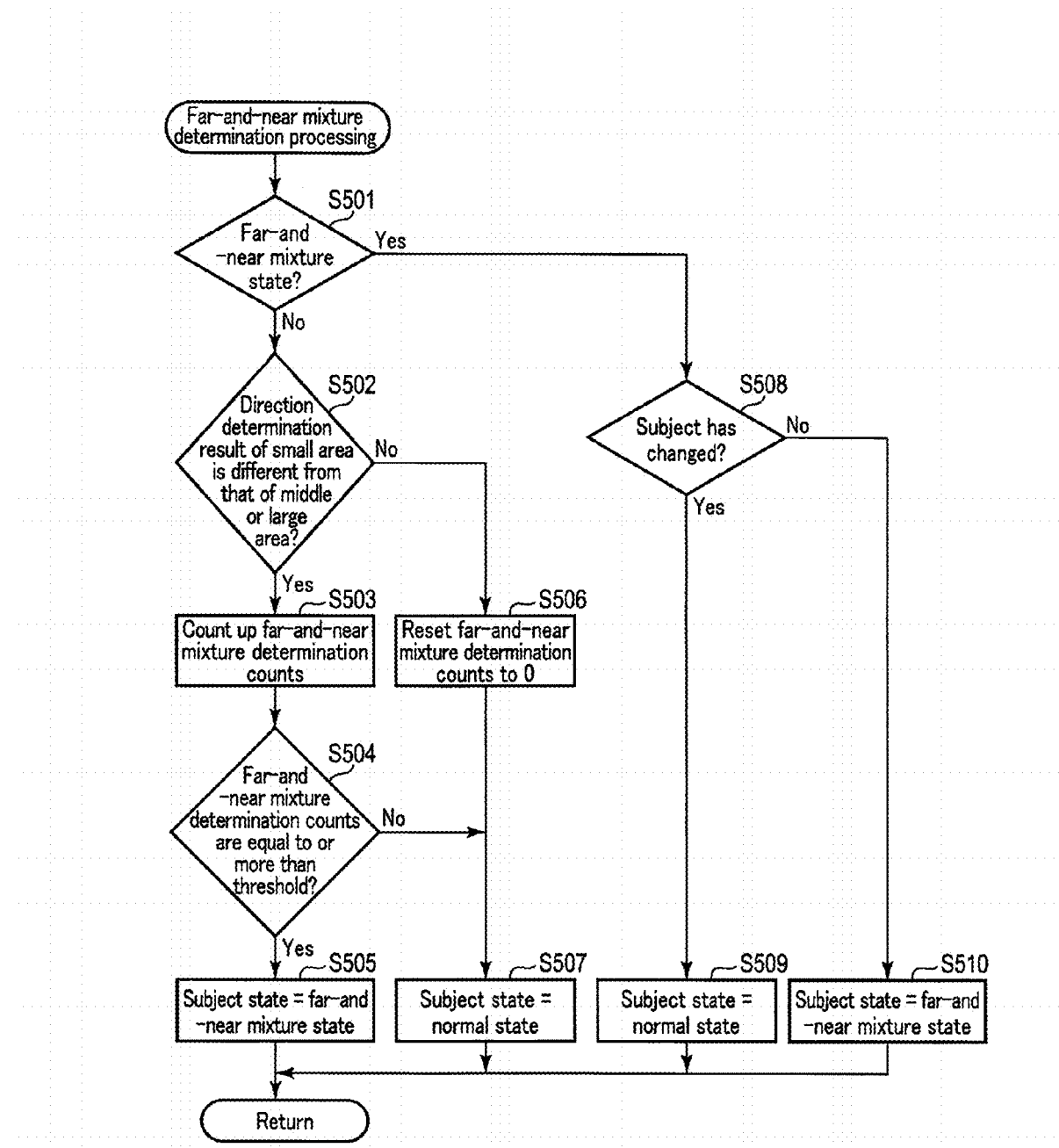
F I G. 18

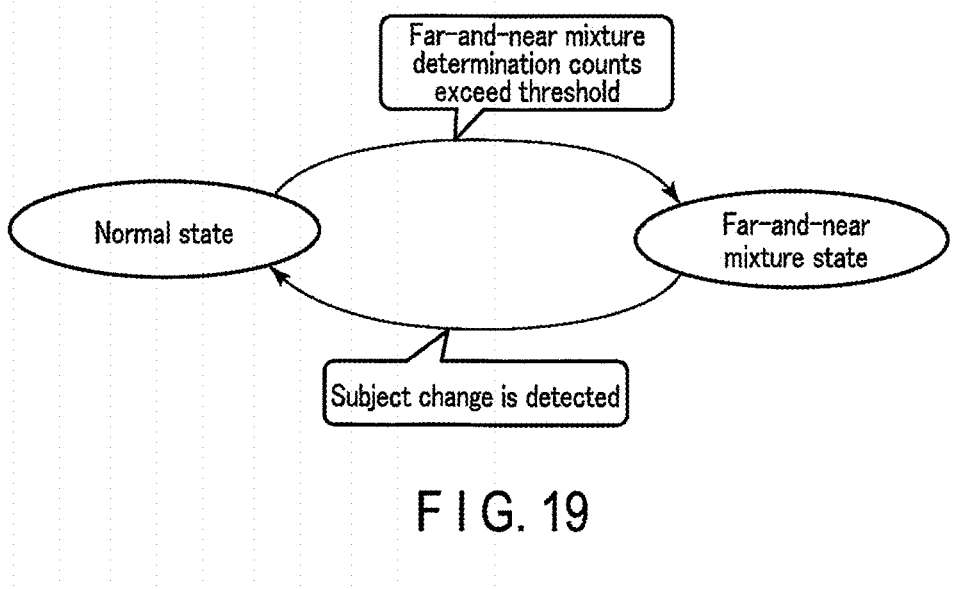
F I G. 19

FOCUS ADJUSTMENT DEVICE AND CONTROL METHOD OF FOCUS ADJUSTMENT DEVICE

CROSS-REFERENCE TO RELATED APPLICATIONS

This application is a Continuation Application of PCT Application No. PCT/JP2016/054379, filed Feb. 16, 2016 and based upon and claiming the benefit of priority from prior Japanese Patent Application No. 2015-077906, filed Apr. 6, 2015, the entire contents of all of which are incorporated herein by reference.

BACKGROUND OF THE INVENTION

1. Field of the Invention

The present invention relates to a focus adjustment device and a control method of a focus adjustment device.

2. Description of the Related Art

It is known that regarding an autofocus (AF) function of an imaging device, when a far subject and a near subject are mixed in an AF area, it is generally difficult to bring the near subject into focus. Thus, there has been known a technique regarding AF to also correctly bring the near subject into focus in a far-and-near mixed subject in which the far subject and the near subject are mixed.

For example, Jpn. Pat. Appln. KOKAI Publication No. 2010-107578 discloses the following technique. That is, there are provided a first region which is an AF area, and a second region which is an AF area included in the first region. When in-focus is detected by use of image data in the first region, an evaluation of in-focus using image data in the second region is also made. In the far-and-near mixed subject, a difference between the focus evaluation using the first region and the focus evaluation using the second region is recognized. Accordingly, when different tendencies are recognized in the result of the focus evaluation using the second region and the result of the focus evaluation using the first region, a focus detection operation using image data in the second region is continued. Correct in-focus of the near subject in the far-and-near mixed subject is obtained by this method.

Furthermore, for example, Jpn. Pat. Appln. KOKAI Publication No. 2007-178480 discloses the following technique. There are provided a normal area which is an AF area, and a small area which is an AF area smaller than the normal area. An in-focus position using image data in the normal area and an in-focus position using image data in the small area are found. There is a difference between the in-focus position by the normal area and the in-focus position by the small area, the in-focus position by the small area is reliable, and the in-focus position by the small area is at a shorter distance than the in-focus position by the normal area, in which case the in-focus position of the small area is adopted; otherwise the in-focus position by the normal area is adopted. Correct in-focus of the near subject in the far-and-near mixed subject is obtained by this method as well.

BRIEF SUMMARY OF THE INVENTION

According to an aspect of the present invention, a focus adjustment device includes an image sensor which receives a light flux passing through an imaging lens including a focus lens, performs imaging, and then generates an image signal. The focus adjustment device performs a focus adjustment in which the focus lens is moved on the basis of the image signal. The focus adjustment device includes a focus detection region setting section which sets focus detection regions inside a region to be imaged by the image sensor, at least two of the focus detection regions having at least parts in common and being different in size from one another; a direction determination section which detects, regarding each of the focus detection regions, contrast of the image signal in the focus detection region, and determines a movement direction of the focus lens to be in focus on the basis of a change of the contrast caused by the movement of the focus lens; and a control section which causes the image sensor to repeat an imaging operation, and at the same time, performs, on the basis of the movement direction, one of a first focus adjustment operation to move the focus lens while minutely vibrating the focus lens to perform the focus adjustment, and a second focus adjustment operation to perform the focus adjustment while moving the focus lens in one direction. The control section repetitively determines whether or not determination results of the movement direction obtained in the respective focus detection regions are different while performing the first focus adjustment operation, and when it is consecutively determined a predetermined number of times or more that the determination results of the movement direction are different, the control section inhibits a switchover from the first focus adjustment operation to the second focus adjustment operation, whereas when it is not consecutively determined a predetermined number of times or more that the determination results of the movement direction are different, the control section does not inhibit the switchover.

According to an aspect of the present invention, a focus adjustment device includes an image sensor which receives a light flux passing through an imaging lens including a focus lens, performs imaging, and then generates an image signal. The focus adjustment device performs a focus adjustment in which the focus lens is moved on the basis of the image signal. The focus adjustment device includes a focus detection region setting section which sets focus detection regions inside a region to be imaged by the image sensor, at least two of the focus detection regions having at least parts in common and being different in size from one another; a direction determination section which detects, regarding each of the focus detection regions, contrast of the image signal in the focus detection region, and determines a movement direction of the focus lens to be in focus on the basis of a change of the contrast caused by the movement of the focus lens; and a control section which causes the image sensor to repeat an imaging operation, and at the same time, moves the focus lens while minutely vibrating the focus lens to perform the focus adjustment, on the basis of contrast of the focus detection region. The control section repetitively determines whether or not determination results of the movement direction obtained in the respective focus detection regions are different, and when it is consecutively determined a predetermined number of times or more that the determination results of the movement direction are different, the control section performs a focus adjustment operation by minute vibration of the focus lens on the basis of the contrast of the focus detection region smaller in area among the focus detection regions.

According to an aspect of the present invention, a control method of a focus adjustment device is provided. The focus adjustment device includes an image sensor which receives a light flux passing through an imaging lens including a focus lens, performs imaging, and then generates an image signal. The focus adjustment device performs a focus adjustment in which the focus lens is moved on the basis of the image signal. The method includes setting focus detection regions inside a region to be imaged by the image sensor, at least two of the focus detection regions having at least parts in common and being different in size from one another; detecting, regarding each of the focus detection regions, contrast of the image signal in the focus detection region, and determining a movement direction of the focus lens to be in focus on the basis of a change of the contrast caused by the movement of the focus lens; and causing the image sensor to repeat an imaging operation, and at the same time, performing, on the basis of the movement direction, one of a first focus adjustment operation to move the focus lens while minutely vibrating the focus lens to perform the focus adjustment, and a second focus adjustment operation to perform the focus adjustment while moving the focus lens in one direction. Whether or not determination results of the movement direction obtained in the respective focus detection regions are different is repetitively determined while the first focus adjustment operation is performed, and when it is consecutively determined a predetermined number of times or more that the determination results of the movement direction are different, a switchover from the first focus adjustment operation to the second focus adjustment operation is inhibited, whereas when it is not consecutively determined a predetermined number of times or more that the determination results of the movement direction are different, the switchover is not inhibited.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 10 is a flowchart showing one example of wob control processing;

FIG. 12 is a flowchart showing one example of the direction determination processing;

FIG. 13 is a table showing one example of a determination method of an AF area movement direction;

FIG. 14 is a table showing one example of a determination method of an overall movement direction;

FIG. 15 is a table showing one example of the determination method of the overall movement direction;

FIG. 16A is a flowchart showing one example of overall direction determination processing;

FIG. 18 is a flowchart showing one example of far-and-near mixture determination processing; and FIG. 19 is a chart illustrating the transition of determination results of a normal state and a far-and-near mixture state.

DETAILED DESCRIPTION OF THE INVENTION

One embodiment of the present invention is described with reference to the drawings. An imaging device according to the present embodiment includes a function as a focus adjustment device to perform a focus adjustment, and performs an autofocus (AF) operation. In the imaging device according to the present embodiment, satisfactory moving image AF is performed. Here, the moving image AF refers to continuous AF which is intended to keep a subject in focus during moving image recording. In the moving image AF, how a focus lens moves is recorded in a moving image, so that good appearance of moving images to be recorded is considered important. Here, conditions of the good appearance of the moving image AF are as follows: there is no action which far exceeds an in-focus position when a focus position is changed; AF does not sway when the imaging device is panned or tilted; no action such as hunting is performed due to uncertainty of AF; and no rapid action is abruptly performed. Thus, "stability" is required in the moving image AF. A quick and abrupt action which is required by AF for still image photography is not preferred in the moving image AF. A "slow" and "steady" focus operation is considered proper in the moving image AF. However, it is naturally required to keep the subject in focus, so that achieving both stability and tracking performance is required.

Figure 1:
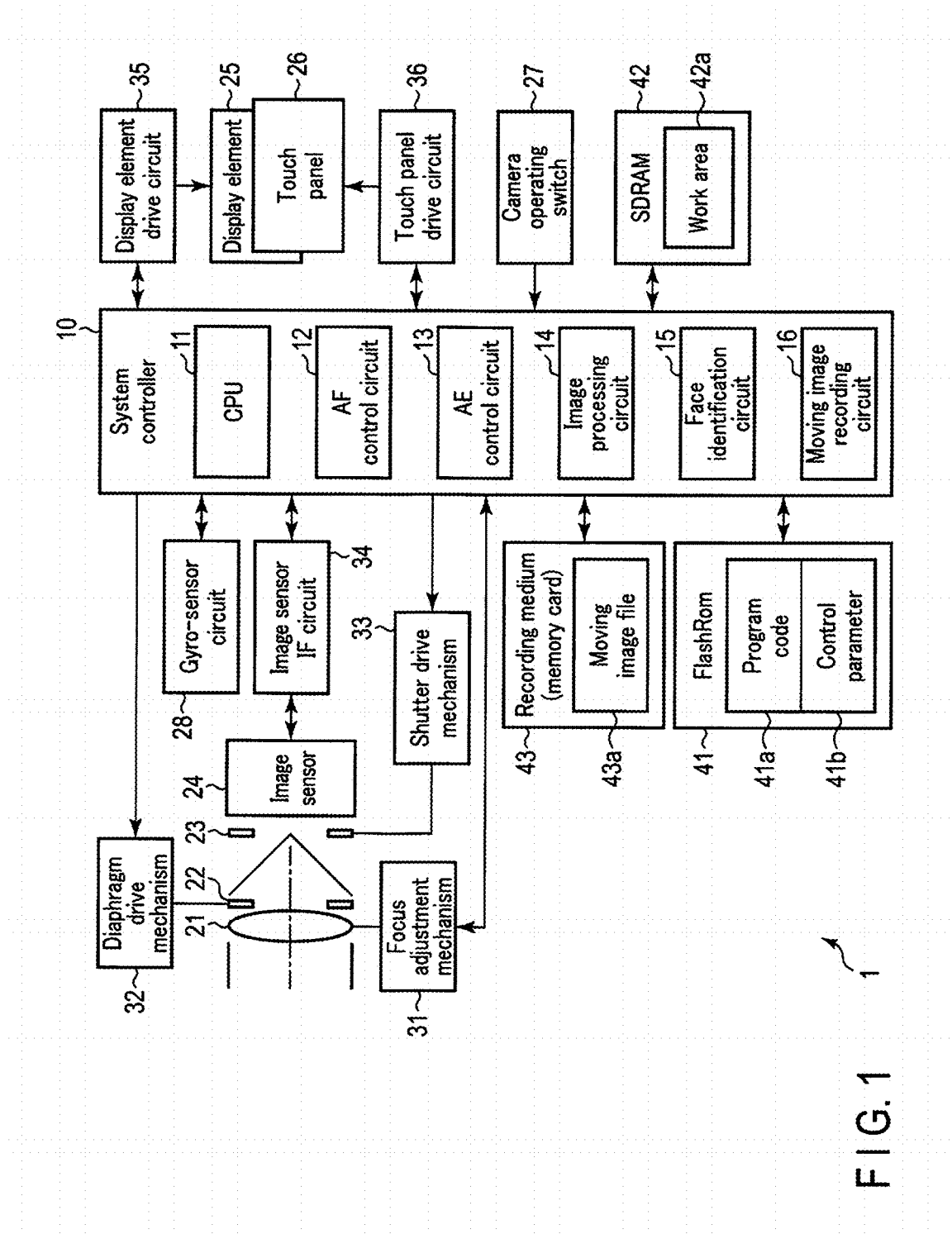
FIG. 1 is a block diagram showing an overview of a configuration example of an imaging device according to one embodiment.

An overview of a configuration example of an imaging device 1 according to the present embodiment is shown in FIG. 1. As shown in FIG. 1, the imaging device 1 comprises a system controller 10 which controls the operation of each part of the imaging device 1.

The imaging device 1 also comprises a lens group 21, a diaphragm 22, a shutter 23, an image sensor 24, a display element 25, a touch panel 26, a camera operating switch 27, a gyro-sensor circuit 28, a focus adjustment mechanism 31, a diaphragm drive mechanism 32, a shutter drive mechanism 33, an image sensor IF circuit 34, a display element drive circuit 35, and a touch panel drive circuit 36.

The lens group 21 as an imaging lens includes multiple lenses. The lens group 21 includes a focus lens for focus adjustment. The focus of a subject image formed on the image sensor 24 is adjusted by the movement of the focus lens in an optical axis direction. The diaphragm 22 adjusts the amount of light which enters the image sensor 24 via the lens group 21. An optical system including the lens group 21, the diaphragm 22, and others may be configured as an interchangeable lens attachable to and detachable from the main body of the imaging device 1. The shutter 23 is provided in front of the image sensor 24, and controls the entrance of light into the image sensor 24 via the lens group 21. The image sensor 24 includes, for example, a CCD image sensor or a CMOS image sensor. The image sensor 24 receives a light flux which passes through the lens group 21, that is, the subject image formed by the lens group 21, and generates an image signal by photoelectric conversion.

The focus adjustment mechanism 31 moves the focus lens included in the lens group 21 in the optical axis direction to adjust focus under the control of the system controller 10. The diaphragm drive mechanism 32 drives the diaphragm 22 under the control of the system controller 10. The shutter drive mechanism 33 drives the shutter 23 under the control of the system controller 10. The image sensor IF circuit 34 reads the image signal from the image sensor 24, and outputs, to the system controller 10, image data converted into a digital signal.

The display element 25 includes, for example, a liquid crystal display. The display element 25 displays various images such as live-view images, taken images, and operational screens. The touch panel 26 is provided on the display element 25, and acquires touch input by a user.

The display element drive circuit 35 controls a display operation by the display element 25 under the control of the system controller 10. The touch panel drive circuit 36 controls the acquisition of the touch input by the touch panel 26 under the control of the system controller 10.

The camera operating switch 27 includes, for example, a release switch, a record button, and a cross key to perform various inputs. The camera operating switch 27 acquires an input by the user, and transmits this input to the system controller 10.

The gyro-sensor circuit 28 detects the attitude of the imaging device 1. The gyro-sensor circuit 28 transmits information regarding the attitude of the imaging device 1 to the system controller 10. The gyro-sensor circuit 28 may not only include an angular velocity sensor which detects an angular velocity sensor but also include an acceleration sensor.

The imaging device 1 comprises a flash ROM 41, an SDRAM 42, and a recording medium 43. The flash ROM 41 records a program code 41a and a control parameter 41b which are used by, for example, the system controller 10 to control the operation of the imaging device 1. The SDRAM 42 is provided with a work area 42a which is a storage region for use in the computation by the system controller 10. The recording medium 43 records data for still images and moving image files 43a obtained by the imaging device 1. The recording medium 43 is attachable to and detachable from the imaging device 1.

The system controller 10 includes a central processing unit (CPU) 11, an AF control circuit 12, an AE control circuit 13, an image processing circuit 14, a face identification circuit 15, and a moving image recording circuit 16.

The CPU 11 performs various computations by use of the program code 41a and the control parameter 41b recorded in the flash ROM 41. The AF control circuit 12 performs various computations regarding AF, and controls the operations of the focus adjustment mechanism 31 and others. The AE control circuit 13 performs various computations regarding exposure, and controls the operations of the diaphragm drive mechanism 32, the shutter drive mechanism 33, and others. The image processing circuit 14 subjects, to image processing, image data generated in the image sensor 24 and acquired via the image sensor IF circuit 34. The face identification circuit 15 performs face identification processing to identify a face included in a subject imaged by the image sensor 24. The moving image recording circuit 16 records, in the recording medium 43, data for moving images which has been generated in the image sensor 24, acquired via the image sensor IF circuit 34, and subjected to the image processing in the image processing circuit 14. The AF control circuit 12, the AE control circuit 13, the image processing circuit 14, the face identification circuit 15, the moving image recording circuit 16, and others can be configured by, for example, application specific integrated circuits (ASIC).

In the imaging device 1 according to the present embodiment, there are three kinds of phases as phases of an AF operation: a wobbling phase (wob), a search phase (search), and a wait phase (wait).

The AF operation performed in the wobbling phase is described with reference to FIG. 2 and FIG. 3. In the wobbling phase, the focus lens is, for example, minutely driven alternately in a far direction and a near direction frame by frame. The middle position of amplitude is gradually moved simultaneously with the minute vibration, whereby the focus is finely adjusted, or the direction of an in-focus position is determined. Such driving of the focus lens is referred to as wobbling drive (wobbling operation).

Figure 2:
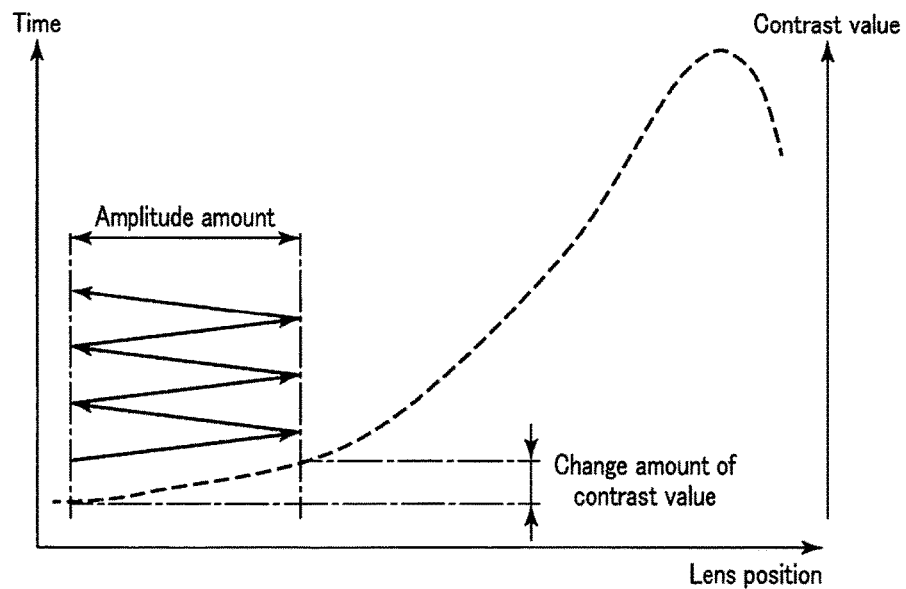
FIG. 2 is a graph illustrating wobbling drive of a focus lens.

FIG. 2 is a diagram illustrating a determination method of the direction of the in-focus position by the wobbling drive. In FIG. 2, a solid line indicates the change of the lens position with respect to the elapse of time, and a broken line indicates the contrast value of an image obtained at the lens position. As indicated by the solid line in FIG. 2, a change of the contrast value is obtained when the lens position moves alternately in the far direction and the near direction. The direction of the in-focus position can be determined on the basis of the change of the contrast value. One of the far and near directions in which the contrast value is higher is the direction of the in-focus position.

When the amplitude amounts in the far direction and the near direction of the lens position are greater, the change of the contrast value is more easily detected, and the direction determination is more easily made. On the other hand, when the amplitude amounts are great, the movement of the focus lens recorded in moving images is more easily visually recognized. In contrast, when the amplitude amounts are small, the movement of the focus lens recorded in the moving images are difficult to visually recognize, the change of the contrast value is more difficult to detect, and the direction determination is more difficult. In the present embodiment, the amplitude amounts are adjusted suitably to subjects and photography conditions.

Figure 3:
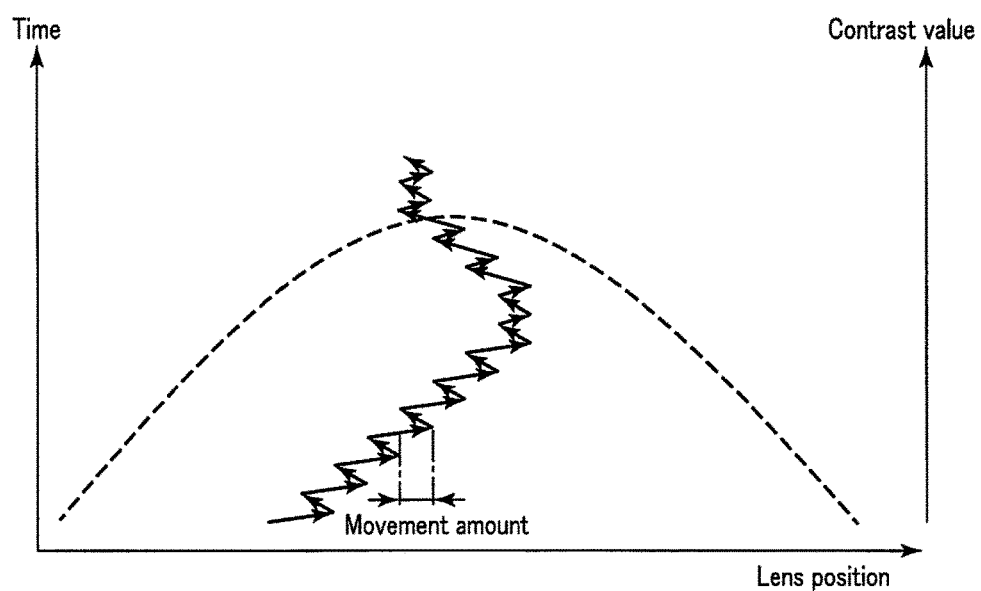
FIG. 3 is a graph illustrating the wobbling drive of the focus lens.

FIG. 3 is a diagram illustrating a method of finely adjusting the focus by the wobbling drive. In FIG. 3, a solid line indicates the change of the lens position with respect to the elapse of time, and a broken line indicates the change of the contrast value of an image obtained at the lens position. When the focus is finely adjusted, the middle position of the amplitude of the lens position moved in the far direction and the near direction gradually moves, as shown in FIG. 3. This movement is made on the basis of information about the acquired contrast value so that the contrast value is maximized. The focus is finely adjusted by this movement. When this movement amount is greater, in-focus is achieved earlier, but unnecessary movement of the focus lens recorded in moving images is more easily made. In contrast, when this movement amount is smaller, it takes more time to achieve in-focus, but unnecessary movement of the focus lens recorded in moving images is not easily made.

Figure 4:
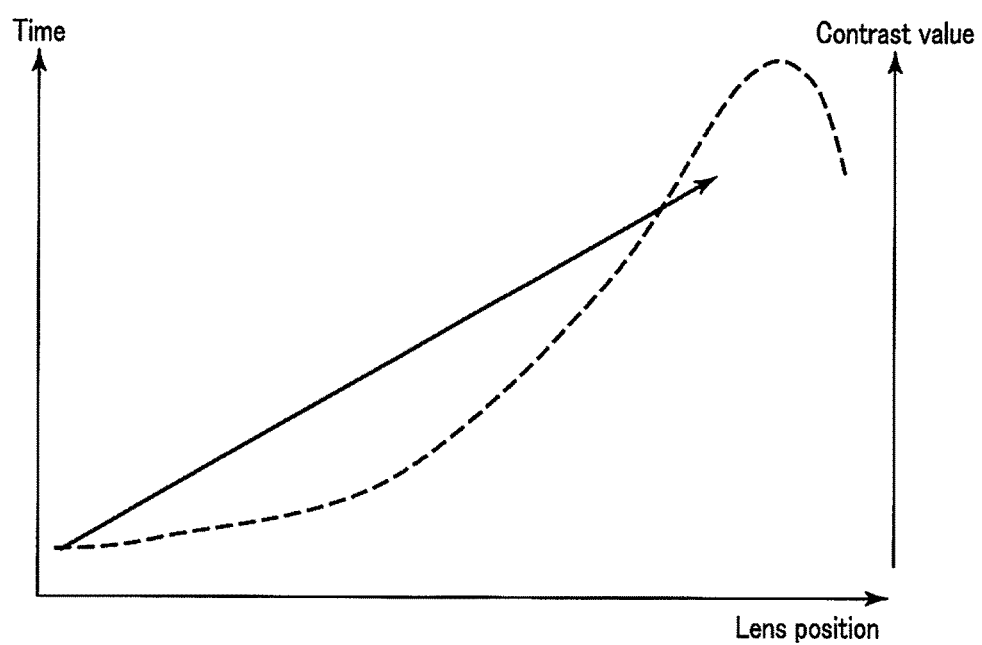
FIG. 4 is a graph illustrating scan drive of the focus lens.

The AF operation performed in the search phase is described with reference to FIG. 4. In FIG. 4, a solid line indicates the change of the lens position with respect to the elapse of time, and a broken line indicates the change of the contrast value of an image obtained at the lens position. In the search phase, the focus lens continuously moves in one direction. Such driving of the focus lens is referred to as scan drive (scan operation). When the focus lens is scan-driven, the contrast value changes in accordance with the focus state of the focus lens. The in-focus position can be searched for by the scan drive as well. Moreover, because the focus lens only moves in one direction, the movement of the focus lens by the scan drive is faster than the movement of the focus lens by the wobbling drive.

Figure 5:
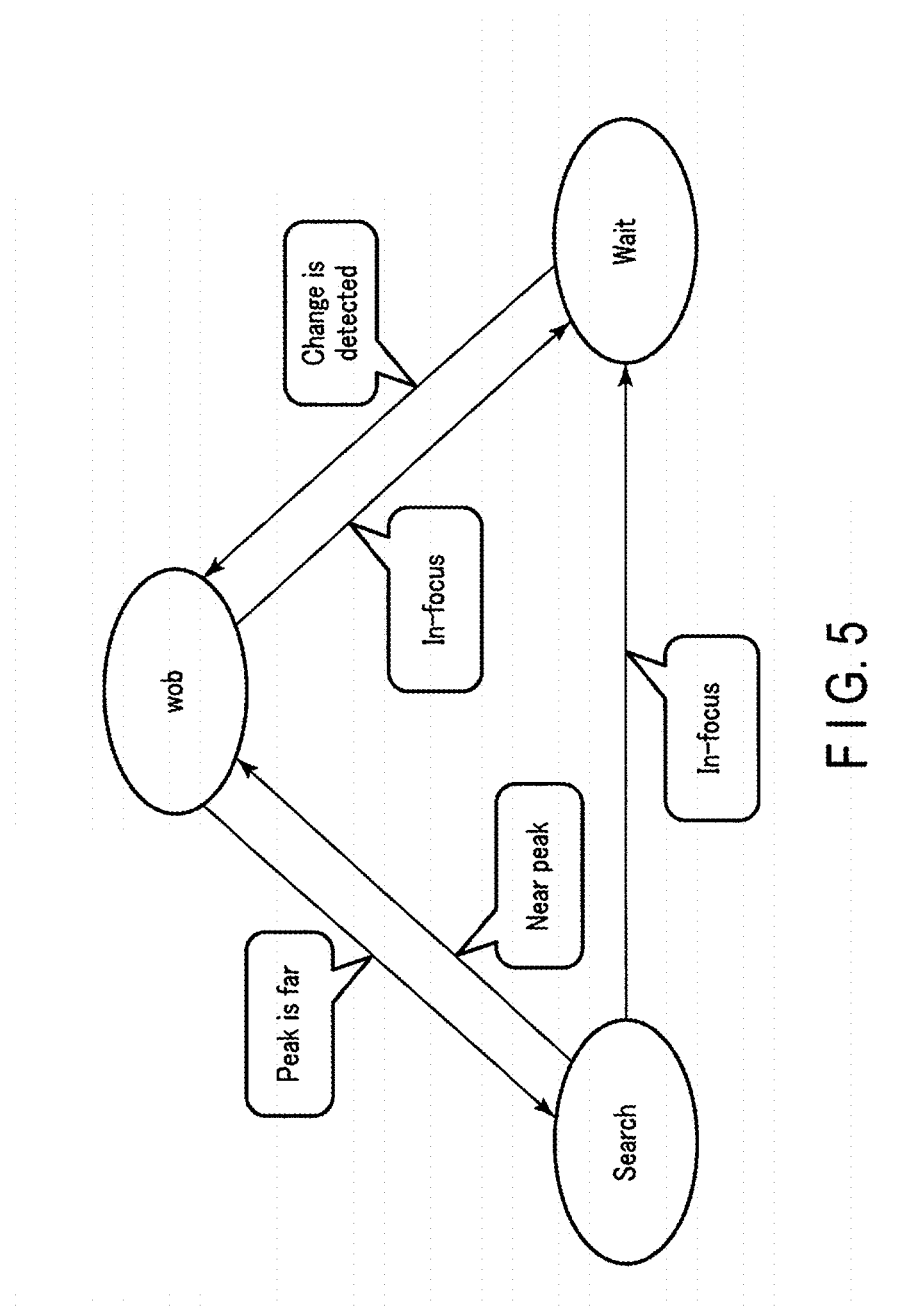
FIG. 5 is a diagram illustrating an overview of a phase transition between a wob phase, a search phase, and a wait phase.

Next, the transition of the control phases is described with reference to FIG. 5. As described above, the control phases according to the present embodiment include the wobbling phase (wob), the search phase (search), and the wait phase (wait). At the start of moving image recording, control is started from the wobbling phase. In the wobbling phase, when the lens position of the focus lens is determined to be far from the in-focus position, that is, when the peak of the contrast value is determined to be far, the operation phase makes the transition to the search phase. Due to the transition to the search phase, the lens position quickly moves to the in-focus position. On the other hand, in the wobbling phase, when the lens position is determined to be the in-focus position, the operation phase makes the transition to the wait phase, and the lens driving is stopped.

In the search phase, when the lens position is determined to be located in the vicinity of the in-focus position, that is, when the contrast value is determined to be located in the vicinity of the peak, the operation phase makes the transition to the wobbling phase. Then the lens position is moved to the in-focus position by the wobbling drive. On the other hand, in the search phase, when the lens position is determined to be the in-focus position, that is, when it is determined that the contrast value has reached the peak and the state is stable, the operation phase makes the transition to the wait phase, and the lens driving is stopped.

In the wait phase, when the motion of the imaging device 1 is detected by the gyro, or there are a change in the contrast value in an image or a change in face information, that is, when the change is detected, the operation phase makes the transition to the wobbling phase. In this instance, the wobbling operation is resumed to maintain the in-focus state.

Figure 6:
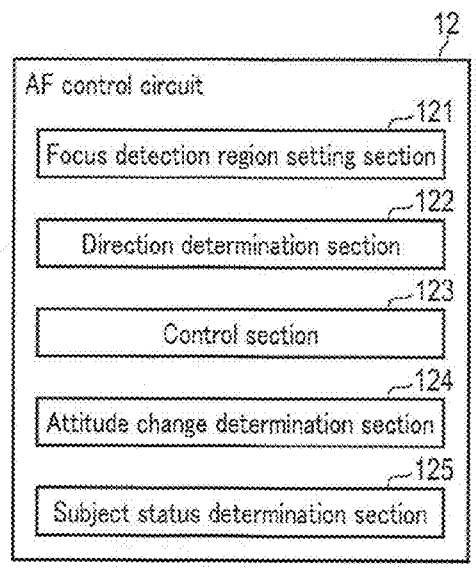
FIG. 6 is a block diagram showing an overview of functions of an AF control circuit.

A functional block diagram of the AF control circuit 12 which controls the above-mentioned AF operation is shown in FIG. 6. As shown in FIG. 6, the AF control circuit 12 includes a focus detection region setting section 121, a direction determination section 122, a control section 123, an attitude change determination section 124, and a subject status determination section 125.

The focus detection region setting section 121 sets focus detection regions in an image obtained by the image sensor 24. Here, the multiple focus detection regions are set, and at least two of the focus detection regions have at least parts in common and are different in size from one another.

The direction determination section 122 performs the following processing for each of the focus detection regions set by the focus detection region setting section 121. That is, the direction determination section 122 detects the contrast of the image, and determines the movement direction of the focus lens to be in focus on the basis of a change of the contrast caused by the movement of the focus lens of the lens group 21.

The control section 123 causes the image sensor 24 to repeat an imaging operation, and at the same time, performs one of a first focus adjustment operation for the wobbling drive of the focus lens and a second focus adjustment operation for the scan drive of the focus lens, on the basis of the movement direction determined by the direction determination section 122.

The attitude change determination section 124 acquires attitude information from the gyro-sensor circuit 28, and then determines whether or not there is an attitude change. The subject status determination section 125 detects the status of the subject on the basis of the image acquired by the image sensor 24.

Next, an overview of the operation of the imaging device 1 according to the present embodiment is described.

Figure 7:
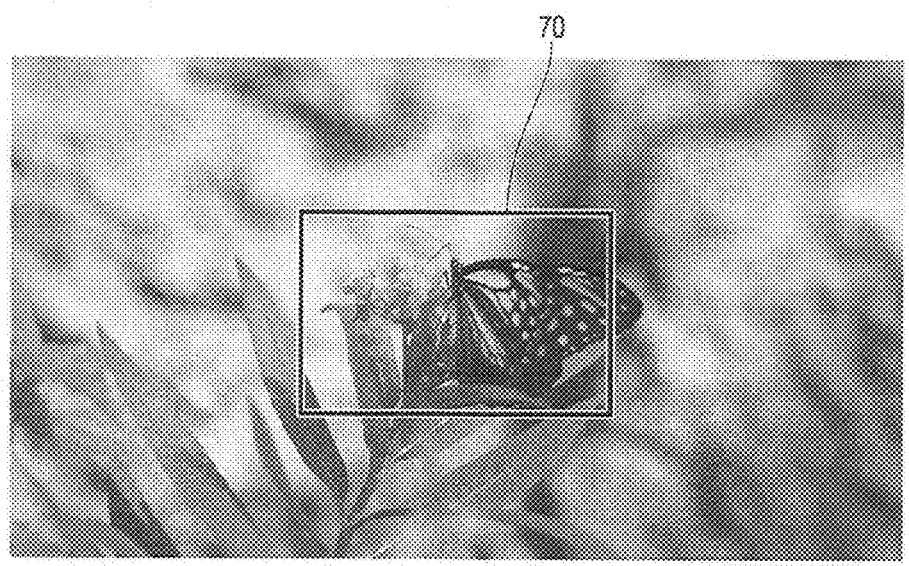
FIG. 7 is a picture illustrating a far-and-near mixed subject.
Figure 8:
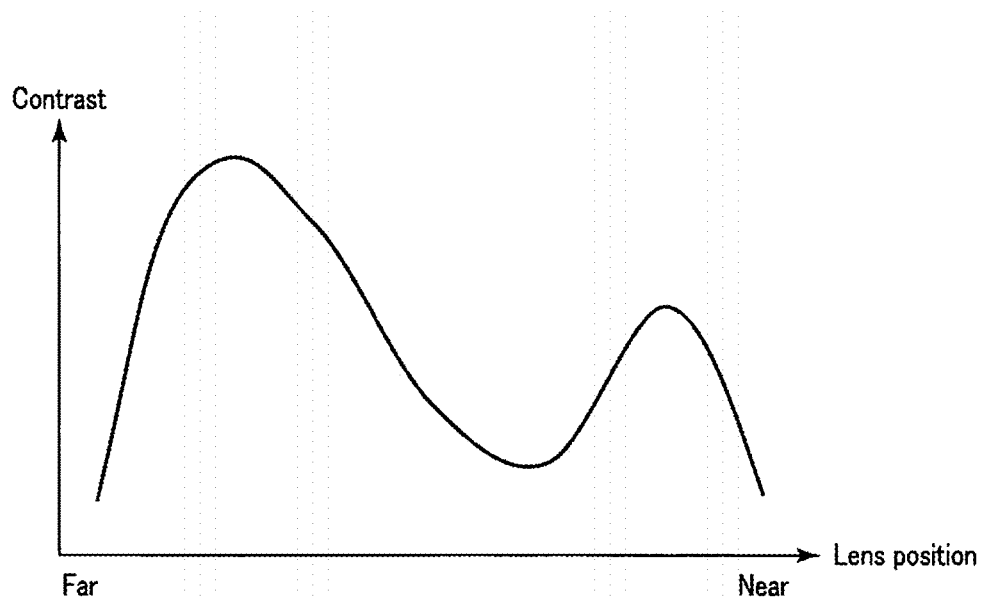
FIG. 8 is a graph illustrating the relation between a focus lens position and a contrast value to be obtained in the far-and-near mixed subject.

The operation of the imaging device 1 according to the present embodiment is highly advantageous to a far-and-near mixed subject in particular. Here, the far-and-near mixed subject refers to a subject in which a near-side subject and a far-side subject are mixed in an AF area. One example of the far-and-near mixed subject is shown in FIG. 7. In FIG. 7, a rectangle in the center shows an AF area 70. As shown in FIG. 7, near-side subjects such as a flower and a butterfly and a far-side subject which is the background are mixed in the AF area 70. A contrast value, that is, a contrast curve obtained in the AF area 70 when the position of the focus lens is moved for the far-and-near mixed subject as a target is as shown in FIG. 8. That is, two local maximum values of contrast are recognized. In general, if an autofocus operation is performed for a subject which shows the contrast curve shown in FIG. 8, the background more easily comes into focus, and the near subject tends to be unable to come into focus due to the influence of the contrast of the background. The imaging device 1 according to the present embodiment can perform an autofocus operation whereby desired in-focus is obtained, even for such a far-and-near mixed subject.

Figure 9:
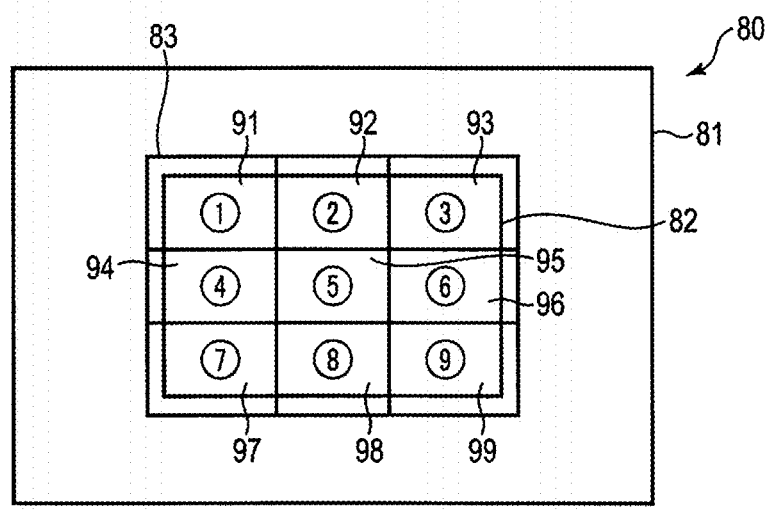
FIG. 9 is a diagram illustrating one example of an AF area group.

Here, an AF area group 80 used in the present embodiment is described with reference to FIG. 9. The AF area group 80 includes a large area 81, a middle area 82, and nine small areas 83. Here, the small areas 83 on the upper left side, in the upper center, on the upper right side, on the middle left side, in the middle center, on the middle right side, on the lower left side, in the lower center, and on the lower right side are referred to as a first small area 91, a second small area 92, a third small area 93, a fourth small area 94, a fifth small area 95, a sixth small area 96, a seventh small area 97, an eighth small area 98, and a ninth small area 99, respectively. A total of eleven AF areas including the large area 81, the middle area 82, and the nine small areas 83 are used together, so that suitable AF operations can be performed for various subjects. It is to be noted that the large area 81 has any size in relation to an image size. For example, the large area 81 is set to about the size of the AF area 70 shown in FIG. 7.

Thus, in the present embodiment, the focus detection region setting section 121 sets, inside an imaging region, the focus detection regions at least two of which have at least parts in common and which are different in size from one another.

When the AF area is smaller, there is a lower possibility of far-and-near mixture in this AF area. Moreover, if more than one small area are prepared in a focus evaluation, small subjects can be more actively evaluated. On the other hand, when the AF area is smaller, there is a greater change in the contrast evaluation value due to the motion of the subject, hand movement, or the like. As a result, there is a possibility of deterioration in AF accuracy and stability. Accordingly, in the present embodiment, the middle area 82 and the large area 81 are also used in the focus evaluation, and both AF accuracy and stability for the far-and-near mixed subject are achieved.

Furthermore, in the present embodiment, there is a difference in the transition of the control phases described with reference to FIG. 5 between the far-and-near mixed subject and other subjects. That is, in the case of the far-and-near mixed subject, the wobbling drive permits better appearance of moving images and various AF determinations of higher stability than the scan drive. As a result, the AF operation is more stable. Accordingly, in the present embodiment, the phase transition from the wobbling phase to the search phase is more inhibited when the subject is determined to be a far-and-near mixed subject than when the subject is not determined to be a far-and-near mixed subject.

Next, details of the operation of the imaging device 1 according to the present embodiment are described.

Wob control processing performed in the wobbling phase is described with reference to a flowchart shown in FIG. 10. The processing shown in FIG. 10 is processing regarding AF performed once every frame in the wobbling phase.

In step S101, the AF control circuit 12 performs end point determination processing. That is, the AF control circuit 12 determines whether or not the lens position of the focus lens has reached an end point. When the lens position has reached the end point, the AF control circuit 12 causes the operation phase to make the transition to the wait phase or continues the wobbling phase in accordance with the adaptability to predetermined conditions.

In step S102, the AF control circuit 12 performs in-focus determination processing. That is, the AF control circuit 12 determines whether or not the current state is the in-focus state from the history of the lens position by the wobbling drive, the absolute value of the current contrast evaluation value, and the change rate of the contrast evaluation value. When it is determined that the in-focus is achieved, the AF control circuit 12 causes the operation phase to make the transition to the wait phase.

In step S103, the AF control circuit 12 performs direction determination processing. That is, the AF control circuit 12 determines whether to move the focus position to the near side or the far side, by using the contrast evaluation values of a total of eleven AF areas including the nine small areas 83, the middle area 82, and the large area 81. Here, the direction determination result of each of all the AF areas is held. The direction determination result is held as "near" in which the focus position is moved to the near side, "far" in which the focus position is moved to the far side, or "indeterminate" in which it is not known whether to move the focus position to the near side or the far side.

In step S104, the AF control circuit 12 performs lens drive setting processing. That is, the AF control circuit 12 performs various settings regarding the wobbling drive to be performed in the next frame, on the basis of the result of the direction determination processing in step S103. For example, the movement direction is reversed if the direction determination result is opposite to the current movement direction, whereas the movement in the same direction is continued if the direction determination result is the same as the current movement direction.

In step S105, the AF control circuit 12 performs phase transition determination processing. That is, the AF control circuit 12 determines whether to make the transition to the search phase in the next frame or continue the wobbling phase, for example, from the history of the direction determination results from the past, and the history of the lens drive by the wobbling drive.

Figure 11:
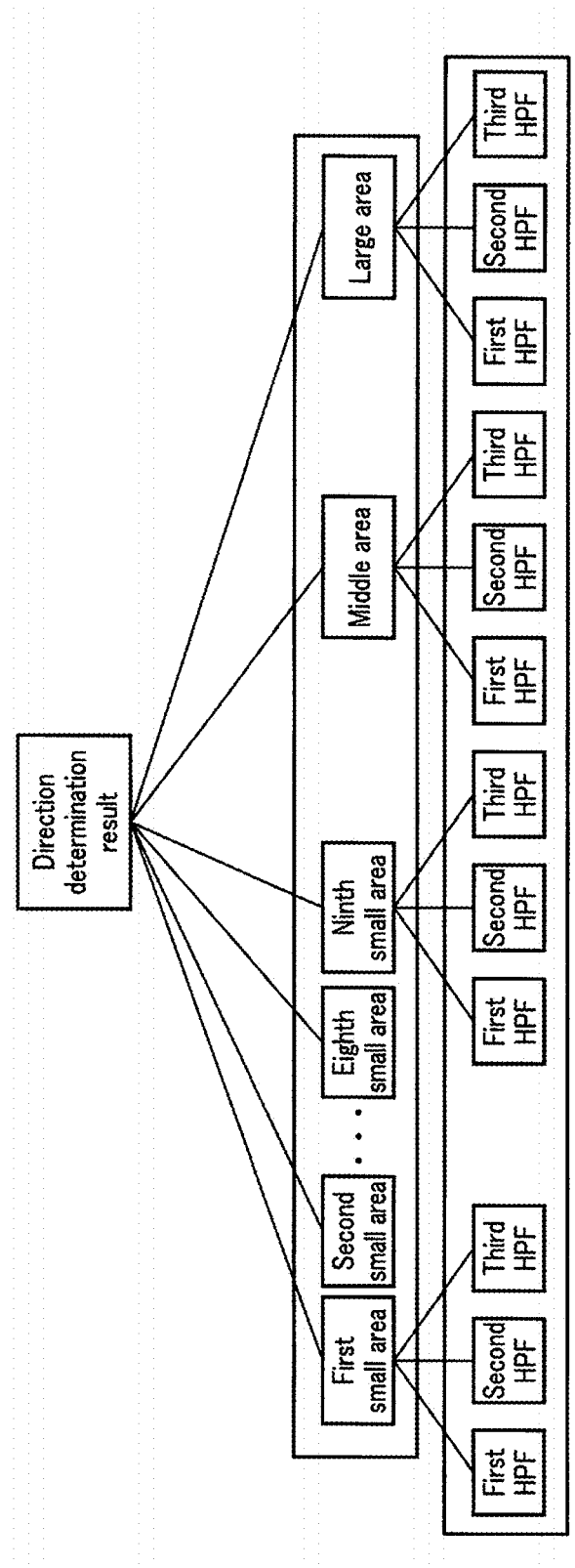
FIG. 11 is a schematic diagram showing one example of direction determination processing.

Next, the direction determination processing performed in step S103 is described. A conceptual diagram of the direction determination processing is shown in FIG. 11. As described above, the direction determination results are decided on the basis of the direction determination results obtained in a total of eleven AF areas including the nine small areas 83, the middle area 82, and the large area 81. In each of the eleven AF areas, the direction determination result is decided on the basis of the contrast evaluation value calculated by use of three kinds of high pass filters (HPFs), as shown in FIG. 11. Here, the HPFs are referred to as the first HPF, the second HPF, and the third HPF, in ascending order of cut-off frequency. Thus, the direction determination decided by use of the AF area group 80 has a hierarchical structure.

One example of the direction determination processing is described with reference to a flowchart shown in FIG. 12.

The processing in step S201 to step S206 is repetitive processing performed in each of the eleven AF areas. That is, in step S201, the AF control circuit 12 decides the AF area for which a direction determination is performed. For example, the following processing is performed for each of the small areas 83 from the first small area 91 in order, and then the following processing is performed for the middle area 82 and the large area 81 in order.

The processing in step S202 to step S204 is repetitive processing performed in each of the three kinds of HPFs. That is, in step S202, the AF control circuit 12 decides the HPF for which a direction determination is performed. For example, the direction determinations are performed for the first HPF, the second HPF, and the third HPF in order.

In step S203, the AF control circuit 12 performs the direction determination processing for each HPF. That is, the AF control circuit 12 decides the movement direction of the focus lens necessary for in-focus, on the basis of the change of the contrast evaluation value by the wobbling drive. That is, for example, when the difference of the contrast evaluation values for three frames is within a predetermined change amount, the direction determination result for each HPF is made determinate by the movement direction of the focus lens. When the change amount of the contrast evaluation value is within or out of a predetermined range of change amount, the direction determination result is decided to be indeterminate. This is because it is determined that the change is made by hand movement or subject movement when the change amount is out of the predetermined range.

In step S204, the AF control circuit 12 changes the HPFs to return the processing to step S202. That is, the processing in step S202 to step S204 is repeated three times so that the determination result of the movement direction in the case of the use of the first HPF, the determination result of the movement direction in the case of the use of the second HPF, and the determination result of the movement direction in the case of the use of the third HPF are obtained.

In step S205, the AF control circuit 12 performs the direction determination processing for each area. That is, the AF control circuit 12 decides the direction determination result for each AF area, on the basis of the direction determination result obtained in the case of the use of the first HPF, the direction determination result obtained in the case of the use of the second HPF, and the direction determination result obtained in the case of the use of the third HPF.

One example of a determination method of the direction determination result of each AF area is described with reference to FIG. 13. The direction determination section 122 of the AF control circuit 12 decides the direction determination results of the AF areas in accordance with a priority order shown in FIG. 13. That is, the direction determination section 122 first determines whether or not the direction determination result obtained by use of the third HPF corresponds to the direction determination result obtained by use of the second HPF. When these direction determination results correspond to each other, the direction determination section 122 decides on these corresponding direction determination results.

When the direction determination result obtained by use of the third HPF does not correspond to the direction determination result obtained by use of the second HPF, the direction determination section 122 determines whether or not the direction determination result obtained by use of the third HPF corresponds to the direction determination result obtained by use of the first HPF. When these direction determination results correspond to each other, the direction determination section 122 decides on these corresponding direction determination results.

When the direction determination result obtained by use of the third HPF does not correspond to the direction determination result obtained by use of the first HPF, the direction determination section 122 determines whether or not the direction determination result obtained by use of the second HPF corresponds to the direction determination result obtained by use of the first HPF. When these direction determination results correspond to each other, the direction determination section 122 decides on these corresponding direction determination results.

When the direction determination result obtained by use of the second HPF does not correspond to the direction determination result obtained by use of the first HPF, the direction determination section 122 determines whether or not the direction determination result obtained by use of the third HPF is indeterminate. When the direction determination result obtained by use of the third HPF is not indeterminate, the direction determination section 122 decides on the direction determination result obtained by use of the third HPF.

When the direction determination result obtained by use of the third HPF is indeterminate, the direction determination section 122 determines whether or not the direction determination result obtained by use of the second HPF is indeterminate. When the direction determination result obtained by use of the second HPF is not indeterminate, the direction determination section 122 decides that the movement direction is the direction determination result obtained by use of the second HPF.

When the direction determination result obtained by use of the second HPF is indeterminate, the direction determination section 122 determines whether or not the direction determination result obtained by use of the first HPF is indeterminate. When the direction determination result obtained by use of the first HPF is not indeterminate, the direction determination section 122 decides on the direction determination result obtained by use of the first HPF. When the direction determination result obtained by use of the first HPF is indeterminate, the direction determination section 122 decides that the direction determination result is indeterminate.

It is to be noted that in the direction determinations of the small areas 83, the direction determination section 122 concludes that the direction determination results regarding all the small areas 83 are "indeterminate" when the attitude change determination section 124 detects an output of the gyro-sensor equal to or more than a predetermined value regarding the detection result by the gyro-sensor circuit 28. Moreover, when the subject status determination section 125 recognizes a high-luminance light source in one of the small areas 83 or detects a motion vector regarding an image in one of the small areas 83, the direction determination section 122 concludes that the direction determination results regarding all the small areas 83 are "indeterminate". Further, in the direction determinations of the small areas 83, when the subject status determination section 125 determines that there is a low-luminance small area 83, there is a low-contrast small area 83, or there is a small area 83 having a contrast change amount higher than a predetermined value, the direction determination section 122 concludes that the direction determination result regarding the corresponding small area 83 is "indeterminate".

Returning to the flowchart shown in FIG. 12, the description continues. In step S206, the AF control circuit 12 changes the AF areas to return the processing to step S201. That is, the processing in step S201 to step S206 is repeated for the eleven AF areas. As a result, the direction determination result regarding each of the AF areas is obtained.

In step S207, the AF control circuit 12 performs overall direction determination processing. That is, the AF control circuit 12 decides an overall direction determination result on the basis of the direction determination result regarding each of the AF areas. One example of a determination method of an overall movement direction is described with reference to FIG. 14. The overall direction determination result is decided in accordance with a priority order shown in FIG. 14.

That is, the direction determination section 122 first determines whether or not the direction determination result regarding the fifth small area 95 is near. When the direction determination result is near, the direction determination section 122 decides that the overall direction determination result is near. When the direction determination result regarding the fifth small area 95 is not near, the direction determination section 122 determines whether or not the direction determination result regarding the eighth small area 98 is near. When the direction determination result is near, the direction determination section 122 decides that the overall direction determination result is near. When the direction determination result regarding the eighth small area 98 is not near, the direction determination section 122 determines whether or not the direction determination result regarding the fourth small area 94 is near. When the direction determination result is near, the direction determination section 122 decides that the overall direction determination result is near. Similarly, the direction determination section 122 determines whether or not the direction determination results regarding the AF areas are near in the order of the sixth small area 96, the second small area 92, the seventh small area 97, the ninth small area 99, the first small area 91, the third small area 93, the middle area 82, and the large area 81. When at least one of the direction determination results is near, the direction determination section 122 decides that the overall direction determination result is near.

On the other hand, when none of the direction determination results regarding the eleven AF areas are near, the direction determination section 122 determines whether or not the direction determination result regarding the fifth small area 95 is far. When the direction determination result is far, the direction determination section 122 decides that the overall direction determination result is far. When the direction determination result regarding the fifth small area 95 is not far, the direction determination section 122 determines whether or not the direction determination result regarding the eighth small area 98 is far. When the direction determination result is far, the direction determination section 122 decides that the overall direction determination result is far. When the direction determination result regarding the eighth small area 98 is not far, the direction determination section 122 determines whether or not the direction determination result regarding the fourth small area 94 is far. When the direction determination result is far, the direction determination section 122 decides that the overall direction determination result is far. Similarly, the direction determination section 122 determines whether or not the direction determination results regarding the AF areas are far in the order of the sixth small area 96, the second small area 92, the seventh small area 97, the ninth small area 99, the first small area 91, the third small area 93, the middle area 82, and the large area 81. When at least one of the direction determination results is far, the direction determination section 122 decides that the overall direction determination result is far. On the other hand, when none of the direction determination results regarding the eleven AF areas are far, the direction determination section 122 decides that the overall direction determination result is indeterminate. The overall direction determination result is decided as above. This is the end of the overall direction determination processing, and the processing returns to the direction determination processing described with reference to FIG. 12.

In the example described above, a higher priority order is set on the sides closer to the center, and a higher priority order is set on the lower sides than on the upper sides. One reason for this is that composition is often decided so that the subject of attention is disposed in the center, and the subject of attention is often located in the lower part of the image rather than in the upper part. Another reason is that the near subject is often present in the lower part of the image rather than in the upper part.

Figure 16B:
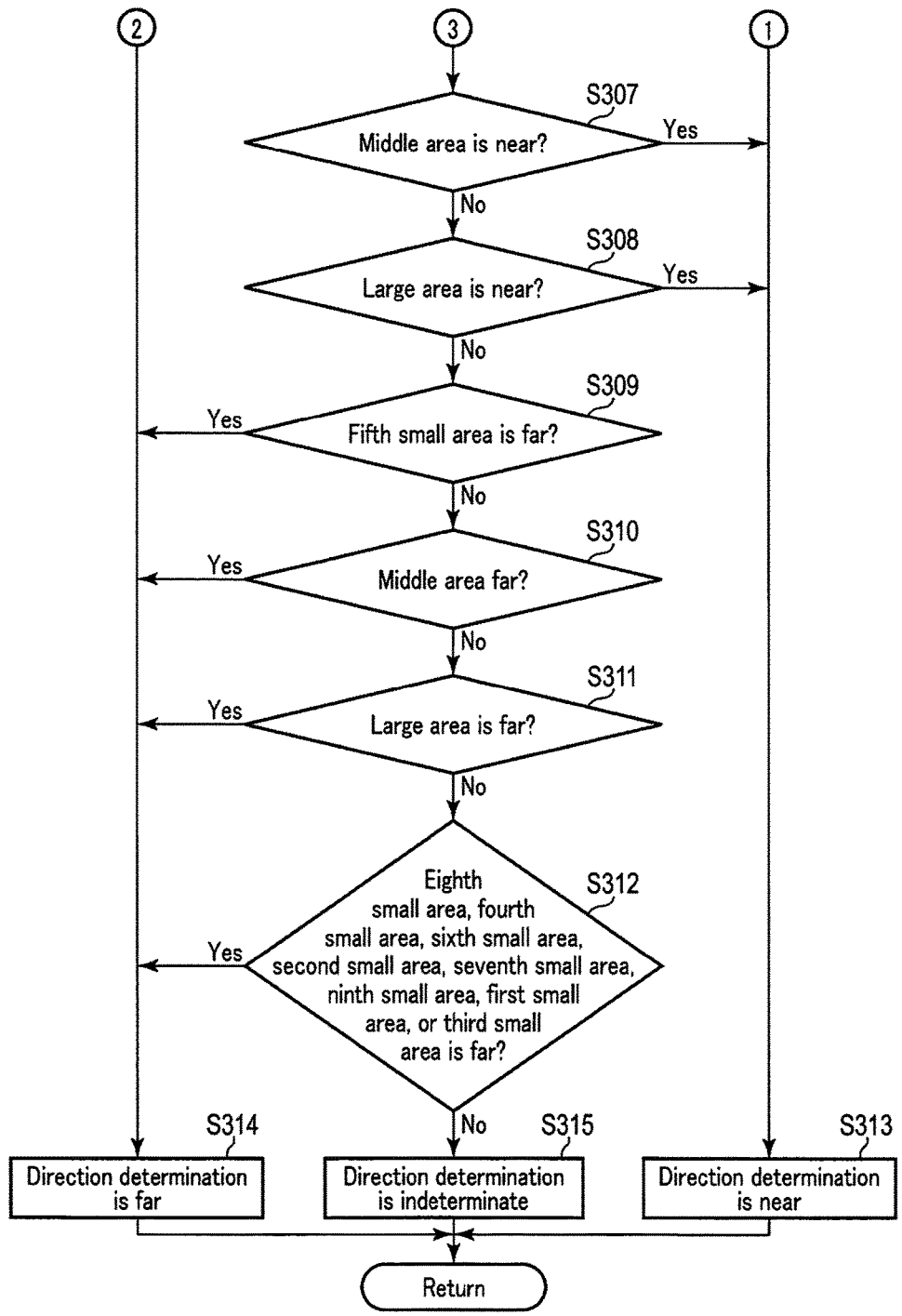
FIG. 16B is a flowchart showing one example of the overall direction determination processing.

Another example of the overall direction determination processing performed in step S207 is described with reference to FIG. 15, FIG. 16A, and FIG. 16B. The overall direction determination result is decided in accordance with a priority order shown in FIG. 15. Therefore, the direction determination section 122 performs the processing in the flowchart shown in FIG. 16A and FIG. 16B.

In step S301, the direction determination section 122 determines whether or not the direction determination results regarding three or more small areas 83 including the fifth small area 95 are near. When the direction determination results regarding three or more small areas 83 including the fifth small area 95 are near, the processing proceeds to step S313. That is, the direction determination section 122 decides that the overall direction determination result is near. When the direction determination results regarding three or more small areas 83 including the fifth small area 95 are not near, the processing proceeds to step S302.

In step S302, the direction determination section 122 determines whether or not the direction determination results regarding three or more small areas 83 excluding the fifth small area 95 are near. When the direction determination results regarding three or more small areas 83 excluding the fifth small area 95 are near, the processing proceeds to step S313. That is, the direction determination section 122 decides that the overall direction determination result is near. When the direction determination results regarding three or more small areas 83 excluding the fifth small area 95 are not near, the processing proceeds to step S303.

In step S303, the direction determination section 122 determines whether or not the direction determination results regarding two small areas 83 including the fifth small area 95 are near. When the direction determination results regarding two small areas 83 including the fifth small area 95 are near, the processing proceeds to step S313. That is, the direction determination section 122 decides that the overall direction determination result is near. When the direction determination results regarding two small areas 83 including the fifth small area 95 are not near, the processing proceeds to step S304.

In step S304, the direction determination section 122 determines whether or not the direction determination results regarding four or more small areas 83 including the fifth small area 95 are far. When the direction determination results regarding four or more small areas 83 including the fifth small area 95 are far, the processing proceeds to step S314. That is, the direction determination section 122 decides that the overall direction determination result is far. When the direction determination results regarding four or more small areas 83 including the fifth small area 95 are not far, the processing proceeds to step S305.

In step S305, the direction determination section 122 determines whether or not the direction determination result regarding the fifth small area 95 is near. When the direction determination result regarding the fifth small area 95 is near, the processing proceeds to step S313. That is, the direction determination section 122 decides that the overall direction determination result is near. When the direction determination result regarding the fifth small area 95 is not near, the processing proceeds to step S306.

In step S306, the direction determination section 122 determines whether or not the direction determination results regarding the eighth small area 98 and the seventh small area 97, the direction determination results regarding the eighth small area 98 and the ninth small area 99, the direction determination results regarding the fourth small area 94 and the seventh small area 97, or the direction determination results regarding the sixth small area 96 and the ninth small area 99 are near. When one of the direction determination results is near, the processing proceeds to step S313. That is, the direction determination section 122 decides that the overall direction determination result is near. When all of the direction determination results are not near, the processing proceeds to step S307.

In step S307, the direction determination section 122 determines whether or not the direction determination result regarding the middle area 82 is near. When the direction determination result regarding the middle area 82 is near, the processing proceeds to step S313. That is, the direction determination section 122 decides that the overall direction determination result is near. When the direction determination result regarding the middle area 82 is not near, the processing proceeds to step S308.

In step S308, the direction determination section 122 determines whether or not the direction determination result regarding the large area 81 is near. When the direction determination result regarding the large area 81 is near, the processing proceeds to step S313. That is, the direction determination section 122 decides that the overall direction determination result is near. When the direction determination result regarding the large area 81 is not near, the processing proceeds to step S309.

In step S309, the direction determination section 122 determines whether or not the direction determination result regarding the fifth small area 95 is far. When the direction determination result regarding the fifth small area 95 is far, the processing proceeds to step S314. That is, the direction determination section 122 decides that the overall direction determination result is far. When the movement direction regarding the fifth small area 95 is not near, the processing proceeds to step S310.

In step S310, the direction determination section 122 determines whether or not the direction determination result regarding the middle area 82 is far. When the direction determination result regarding the middle area 82 is far, the processing proceeds to step S314. That is, the direction determination section 122 decides that the overall direction determination result is far. When the direction determination result regarding the middle area 82 is not far, the processing proceeds to step S311.

In step S311, the direction determination section 122 determines whether or not the direction determination result regarding the large area 81 is far. When the direction determination result regarding the large area 81 is far, the processing proceeds to step S314. That is, the direction determination section 122 decides that the overall direction determination result is far. When the direction determination result regarding the large area 81 is not far, the processing proceeds to step S312.

In step S312, the direction determination section 122 determines whether or not the direction determination result regarding the eighth small area 98, the fourth small area 94, the sixth small area 96, the second small area 92, the seventh small area 97, the ninth small area 99, the first small area 91, or the third small area 93 is far. When the direction determination results regarding at least one of these small areas is far, the processing proceeds to step S314. That is, the direction determination section 122 decides that the overall direction determination result is far. When the direction determination results regarding these small areas are not far, the processing proceeds to step S315.

In step S313, the direction determination section 122 decides that the direction determination result is near, as described above. Further, in step S314, the direction determination section 122 decides that the direction determination result is far, as described above. In step S315, the direction determination section 122 decides that the direction determination result is indeterminate. After the processing in step S313, step S314, or step S315, the overall direction determination processing ends, and the processing returns to the direction determination processing described with reference to FIG. 12.

Thus, in the present embodiment, the determination result of the movement direction regarding the small area 83 smaller in area among the AF areas is adopted by priority.

It is to be noted that a majority decision of the results of the direction determinations of the AF areas may be adopted to create a priority order table. Moreover, regarding the far direction determinations, the middle area 82 and the large area 81 may be given priority over the small area 83 to place great importance on the stability of AF.

After step S207, the direction determination processing ends, as shown in FIG. 12. Then the processing returns to the processing described with reference to FIG. 10.

Figure 17:
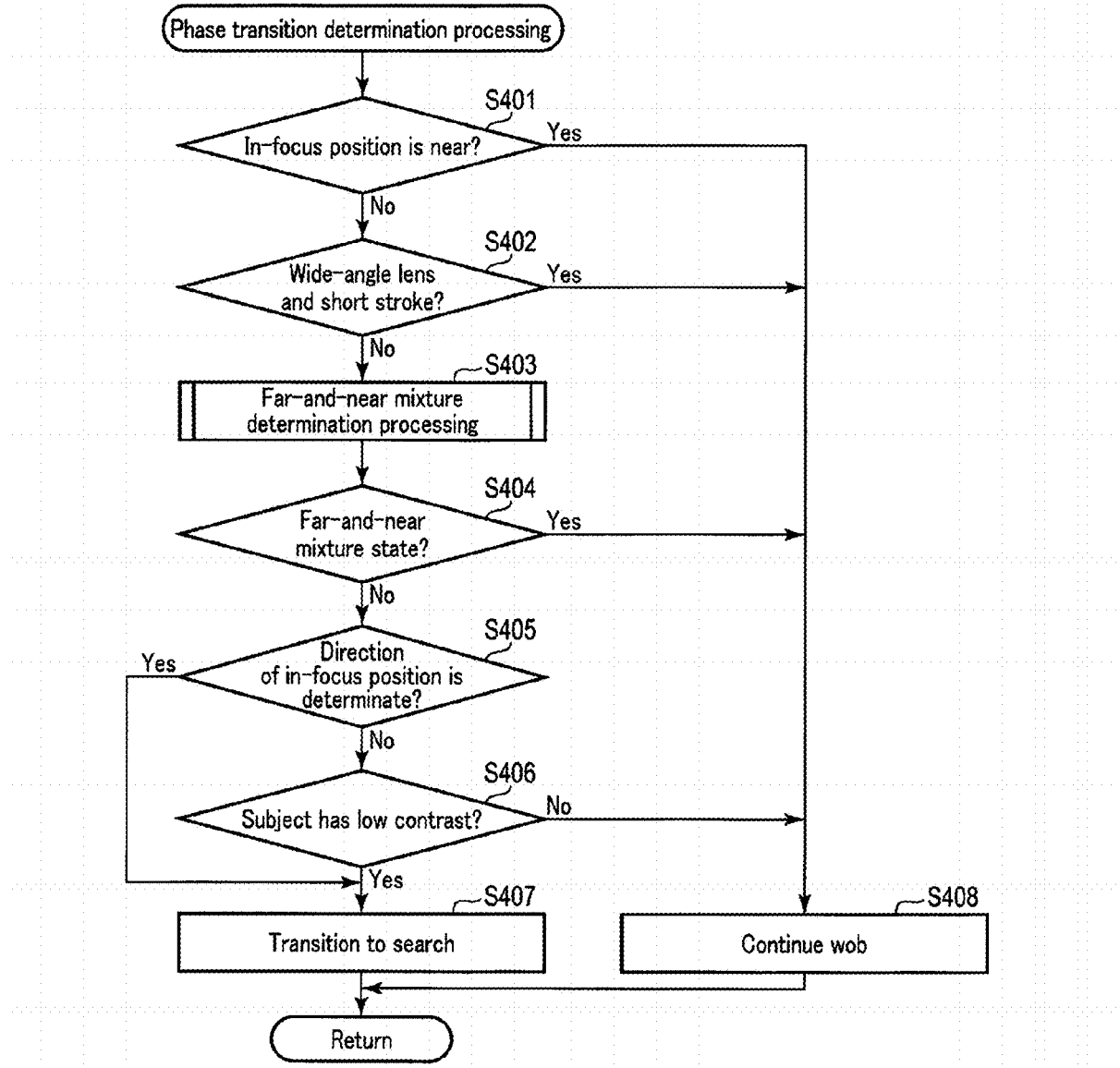
FIG. 17 is a flowchart showing one example of phase transition determination processing.

Next, the phase transition determination processing performed in step S105 is described. FIG. 17 is a flowchart showing one example of the phase transition determination processing.

In step S401, the control section 123 of the AF control circuit 12 determines whether or not the in-focus position is estimated to be near. Whether or not the in-focus position is near is decided, for example, on the basis of the history of the lens position by the wobbling drive, the absolute value of the contrast evaluation value, and the change rate of the contrast evaluation value. When the in-focus position is estimated to be near, the processing proceeds to step S408. In step S408, the control section 123 decides to continue the wobbling phase (wob). If the transition is made to the search phase (search) in the case where the in-focus position is near, there is a possibility of passing the in-focus position, so that the wobbling phase is continued.

When the in-focus position is not estimated to be near in step S401, the processing proceeds to step S402. In step S402, the control section 123 determines whether or not the lens group 21 is a wide-angle lens and has a short stroke. Here, the distance from the near end to far end of the focus lens is divided by an allowable defocus amount, and a value thus obtained is used as the stroke. When the lens group 21 is a wide-angle lens and has a short stroke, the processing proceeds to step S408. As a result, the wobbling phase is continued. As long as the depth of field is great and the stroke is short, there is no slowness of AF without even the transition to the search phase. In contrast, when the transition is made to the search phase, there is a high possibility of extremely passing the in-focus position, and appearance might deteriorate.

When it is determined in step S402 that the lens group 21 is not a wide-angle lens or does not have a short stroke, the processing proceeds to step S403. In step S403, the control section 123 performs far-and-near mixture determination processing. The far-and-near mixture determination processing is processing to determine whether the state of the subject is a far-and-near mixture state or a normal state. The far-and-near mixture determination processing will be described later.

In step S404, the control section 123 determines whether or not the state of the subject is the far-and-near mixture state. When the state is the far-and-near mixture state, the processing proceeds to step S408. As a result, the wobbling phase is continued. When it is determined that the state of the subject is the far-and-near mixture state, the pictures have good appearance if the AF operation is elaborately performed by the wobbling drive. In the far-and-near mixture state, the wobbling drive permits various determinations of AF to be more stable, and causes less uncertainty of AF.

When it is determined in step S404 that the state is not the far-and-near mixture state, the processing proceeds to step S405. In step S405, the control section 123 determines whether or not the direction of the in-focus position is determinate. When the direction of the in-focus position is determinate, the processing proceeds to step S407. In step S407, the control section 123 decides to shift to the search phase (search). When the direction of the in-focus position has been made determinate by the wobbling drive, it is preferable to make the transition to the search phase and smoothly perform AF toward the vicinity of the in-focus position by the scan drive.

When it is determined in step S405 that the direction of the in-focus position is not determinate, the processing proceeds to step S406. In step S406, the control section 123 determines whether or not the subject has low contrast. When the subject does not have low contrast, the processing proceeds to step S408. That is, the wobbling phase is continued.

When it is determined in step S406 that the subject has low contrast, the processing proceeds to step S407. In step S407, the control section 123 causes the operation phase to make the transition to the search phase, as described above. When the subject has low contrast, there is a high possibility that a correct conclusion may not be obtained by the direction determination even if the wob drive is continued. Thus, the operation phase is changed to the search phase, and the scan drive is performed, to search for the in-focus position.

In step S408, the control section 123 keeps the operation phase in the wobbling phase, and continues the wobbling drive, as described above. After step S407 or step S408, the phase transition determination processing ends, and the processing returns to the processing described with reference to FIG. 10.

Next, the far-and-near mixture determination processing performed in step S403 is described with reference to a flowchart shown in FIG. 18.

In step S501, the control section 123 determines whether or not it is determined in the preceding determination that the state is the far-and-near mixture state. It is to be noted that in the initial far-and-near mixture determination processing, the subject state is set to a normal subject state. When the preceding determination is that the state is not the far-and-near mixture state, the processing proceeds to step S502.

In step S502, the control section 123 determines whether or not the direction determination result of at least one of the small areas 83 is different from the direction determination result of the middle area 82 or the large area 81. For example, the direction determination result of the small area 83 is near and the direction determination result of the middle area 82 or the large area 81 is far, it is determined that these direction determination results are different. On the other hand, when the direction determination result of the small area 83 is indeterminate, the direction determination results are not determined to be different. It is to be noted that the direction determination results are not determined to be different either at the time of the initial transition to the wobbling phase. When the direction determination results are different, the processing proceeds to step S503. In step S503, the control section 123 counts up far-and-near mixture determination counts for use in the far-and-near mixture determination. Then the processing proceeds to step S504.

In step S504, the control section 123 determines whether or not the far-and-near mixture determination counts are equal to or more than a predetermined threshold. When it is determined that the far-and-near mixture determination counts are not equal to or more than the predetermined threshold, the processing proceeds to step S507. On the other hand, when the far-and-near mixture determination counts are equal to or more than the predetermined threshold, the processing proceeds to step S505. In step S505, the control section 123 concludes that the subject state is the far-and-near mixture state. Then the far-and-near mixture determination processing ends, and the processing returns to the phase transition determination processing.

When it is determined in step S502 that the direction determination result of the small area 83 is not different from the direction determination result of the middle area 82 or the large area 81, the processing proceeds to step S506. In step S506, the control section 123 resets the far-and-near mixture determination counts to 0. Then the processing proceeds to step S507.

In step S507, the control section 123 concludes that the subject state is not the far-and-near mixture state but the normal state. Then the far-and-near mixture determination processing ends, and the processing returns to the phase transition determination processing.

In the determination in step S501, when the state is the far-and-near mixture state in the preceding determination, the processing proceeds to step S508. In step S508, the control section 123 determines whether or not the subject has changed. Here, when the change of the attitude of the imaging device 1 measured by the gyro-sensor circuit 28 is great, it is determined that the subject has changed. It is also determined that the subject has changed when the contrast change of an acquired image is great and continues for a certain time. It is also determined that the subject has changed when the luminance change of the acquired image is great and continues for a certain time. When the subject has changed, the processing proceeds to step S509. In step S509, the control section 123 concludes that the subject state is the normal state. Then the far-and-near mixture determination processing ends, and the processing returns to the phase transition determination processing.

When it is determined in step S508 that the subject has not changed, the processing proceeds to step S510. In step S510, the control section 123 concludes that the subject state remains to be the far-and-near mixture state. Then the far-and-near mixture determination processing ends, and the processing returns to the phase transition determination processing.

It is to be noted that when there is a change in the detection result by the gyro-sensor circuit 28, when a high-luminance light source is recognized in one of the small areas 83, or when a motion vector is detected regarding an image in one of the small areas 83, the direction determination results regarding all the small areas 83 are "indeterminate". Moreover, when it is determined that there is a low-luminance small area 83, when it is determined that there is a low-contrast small area 83, or when it is determined that there is a small area 83 having a contrast change amount higher than a predetermined value, the direction determination result regarding the corresponding small area 83 is "indeterminate". Thus, in these cases, the far-and-near mixture determination does not conclude, and it is concluded that the subject state is the normal state.

According to the above far-and-near mixture determination processing, the transition is made to the far-and-near mixture state if the far-and-near mixture counts exceed the threshold in a state where it is determined that the subject state is the normal state, as shown in FIG. 19. On the other hand, when a subject change is detected in the far-and-near mixture state, the transition is made to the normal state.

When it is determined by the far-and-near mixture determination processing which determines as above that the state is the far-and-near mixture state, the processing proceeds to step S408, in step S404 of the phase transition determination processing described with reference to FIG. 17. As a result, the wobbling phase is continued. That is, the transition from the wobbling phase to the search phase is inhibited when the subject is the far-and-near mixed subject.

Furthermore, when it is determined that there is a subject change after the transition from the wobbling phase to the search phase is inhibited, it is determined that the subject state is the normal state, so that the inhibition of the transition from the wobbling phase to the search phase is canceled. On the other hand, when it is determined that there is no subject change after the transition from the wobbling phase to the search phase is inhibited, it is determined that the subject state is the far-and-near mixture state, so that the inhibition of the transition from the wobbling phase to the search phase is continued.

According to an AF control method in the present embodiment, the shift from the wobbling phase to the search phase is inhibited when the subject is the far-and-near mixed subject, so that it is possible to acquire stable and accurate moving images having good appearance.

Furthermore, when the shift from the wobbling phase to the search phase is inhibited, the direction determination results by the small areas 83 may be given priority.

In the technique described above in the embodiment, the control mainly described with reference to the flowcharts can be achieved by use of a program. This program can be stored in a recording medium or a recording unit. There are various methods of recording in the recording medium or the recording unit, and the program may be recorded at the time of product shipment, recorded by use of a distributed recording medium, or recorded by use of downloading via the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus adjustment device including an image sensor which receives a light flux passing through an imaging lens including a focus lens, performs imaging, and then generates an image signal, the focus adjustment device performing a focus adjustment in which the focus lens is moved on the basis of the image signal, the focus adjustment device comprising:
    a focus detection region setting circuit which sets focus detection regions inside a region to be imaged by the image sensor, at least two of the focus detection regions having at least parts in common and being different in size from one another;
    a direction determination circuit which detects, regarding each of the focus detection regions, contrast of the image signal in the focus detection region, and determines a movement direction of the focus lens to be in focus on the basis of a change of the contrast caused by the movement of the focus lens; and
    a control circuit which causes the image sensor to repeat an imaging operation to generate consecutive frames of image data, and at the same time, performs, on the basis of the movement direction, one of a first focus adjustment operation to move the focus lens while minutely vibrating the focus lens to perform the focus adjustment, and a second focus adjustment operation to perform the focus adjustment while moving the focus lens in one direction,
    wherein, while performing the first focus adjustment operation, the control circuit repeatedly determines whether or not the movement directions determined by the direction determination circuit for the respective focus detection regions are different from one another, and responsive to determining, for at least a predetermined number of consecutive frames of image data, that the movement directions for the respective focus detection regions are different from one another, the control circuit inhibits a switchover from the first focus adjustment operation to the second focus adjustment operation.

2. The focus adjustment device according to claim 1, wherein in the first focus adjustment operation or the second focus adjustment operation, the circuit adopts, by priority, the determination result of the movement direction regarding the focus detection region smaller in area among the focus detection regions.

3. The focus adjustment device according to claim 1, further comprising an attitude change determination circuit which acquires information regarding the attitude of the focus adjustment device to determine whether or not there is an attitude change,
    wherein responsive to a determination by the attitude change determination circuit that there is an attitude change during the execution of the first focus adjustment operation, the control circuit does not use the determination result of the movement direction regarding the focus detection region smaller in area among the focus detection regions, in the repeated determinations of whether or not the movement directions for the respective focus detection regions are different from one another.

4. The focus adjustment device according to claim 3, further comprising an angular velocity sensor or an acceleration sensor,
    wherein the attitude change determination circuit determines that there is an attitude change when a change of an output of the angular velocity sensor or the acceleration sensor is equal to or more than a predetermined value.

5. The focus adjustment device according to claim 1, further comprising a subject status determination circuit which detects the status of a subject,
    wherein when the subject status determination circuit determines that the subject is in a predetermined status during the execution of the first focus adjustment operation, the control circuit does not use the determination result of the movement direction regarding the focus detection region smaller in area among the focus detection regions, in the repeated determinations of whether or not the movement directions for the respective focus detection regions are different from one another.

6. The focus adjustment device according to claim 5, wherein when determining, on the basis of the image signal output by the image sensor, that luminance of the subject is lower than a predetermined value, that a value of the contrast is lower than a predetermined value, or that the subject includes a light source, the subject status determination circuit determines that the subject is in the predetermined status.

7. The focus adjustment device according to claim 5, wherein when determining, on the basis of the image signal repetitively output by the image sensor, that a change amount of a value of the contrast of the subject is higher than a predetermined value, or that a change amount of a motion vector is higher than a predetermined value, the subject status determination circuit determines that the subject is in the predetermined status.

8. The focus adjustment device according to claim 1, further comprising an attitude change determination circuit which acquires information regarding the attitude of the focus adjustment device to determine whether or not there is an attitude change, wherein after inhibiting the switchover, the control circuit continues the inhibition of the switchover responsive to a determination, by the attitude change determination circuit, that the attitude change is small, and otherwise the control circuit does not continue the inhibition of the switchover responsive to a determination, by the attitude change determination circuit, that the attitude change is great.

9. The focus adjustment device according to claim 8, further comprising an angular velocity sensor or an acceleration sensor,
wherein the attitude change determination circuit determines that the attitude change is great when a change of an output of the angular velocity sensor or the acceleration sensor is equal to or more than a predetermined value.

10. The focus adjustment device according to claim 1, further comprising a subject status determination circuit which determines the status of a subject,
wherein after inhibiting the switchover, the control circuit continues the inhibition of the switchover responsive to a determination, by the subject status determination circuit, that a change in the status of the subject is small, and otherwise the control circuit does not continue the inhibition of the switchover responsive to a determination, by the subject status determination circuit, determines the change in the status of the subject is great.

11. The focus adjustment device according to claim 10, wherein on the basis of the image signal repetitively output by the image sensor, the subject status determination circuit determines that the change in the status of the subject is great when a state where a change of a value of the contrast of the subject is greater than a predetermined value continues for a predetermined time or more, or when a state where a change of luminance of the subject is greater than a predetermined value continues for a predetermined time or more.

12. A focus adjustment device including an image sensor which receives a light flux passing through an imaging lens including a focus lens, performs imaging, and then generates an image signal, the focus adjustment device performing a focus adjustment in which the focus lens is moved on the basis of the image signal, the focus adjustment device comprising:
a focus detection region setting circuit which sets focus detection regions inside a region to be imaged by the image sensor, at least two of the focus detection regions having at least parts in common and being different in size from one another;
a direction determination circuit which detects, regarding each of the focus detection regions, contrast of the image signal in the focus detection region, and determines a movement direction of the focus lens to be in focus on the basis of a change of the contrast caused by the movement of the focus lens; and
a control circuit which causes the image sensor to repeat an imaging operation to generate consecutive frames of image data, and at the same time, moves the focus lens while minutely vibrating the focus lens to perform the focus adjustment, on the basis of contrast of the focus detection region,
wherein the control circuit repeatedly determines whether or not determination results of the movement directions determined by the direction determination circuit for the respective focus detection regions are different from one another, and responsive to determining, for at least a predetermined number of consecutive frames of image data, that the movement directions for the respective focus detection regions are different from one another, the control circuit performs a focus adjustment operation by minute vibration of the focus lens on the basis of the contrast of the focus detection region smaller in area among the focus detection regions.

13. A control method of a focus adjustment device including an image sensor which receives a light flux passing through an imaging lens including a focus lens, performs imaging, and then generates an image signal, the focus adjustment device performing a focus adjustment in which the focus lens is moved on the basis of the image signal, the control method comprising:
setting focus detection regions inside a region to be imaged by the image sensor, at least two of the focus detection regions having at least parts in common and being different in size from one another;
detecting, regarding each of the focus detection regions, contrast of the image signal in the focus detection region, and determining a movement direction of the focus lens to be in focus on the basis of a change of the contrast caused by the movement of the focus lens; and
causing the image sensor to repeat an imaging operation to generate consecutive frames of image data, and at the same time, performing, on the basis of the movement direction, one of a first focus adjustment operation to move the focus lens while minutely vibrating the focus lens to perform the focus adjustment, and a second focus adjustment operation to perform the focus adjustment while moving the focus lens in one direction,
wherein while the first focus adjustment operation is performed, the control method repeatedly determines whether or not the movement directions determined for the respective focus detection regions are different from one another, and responsive to determining, for at least a predetermined number of consecutive frames of image data, that the movement directions of the respective focus detection regions are different from one another, a switchover from the first focus adjustment operation to the second focus adjustment operation is inhibited.

* * * * *